United States Patent [19]

McCann et al.

[11] Patent Number: 4,696,521

[45] Date of Patent: Sep. 29, 1987

[54] VEHICLE ANTI-SKID AIR BRAKING SYSTEMS

[75] Inventors: Denis J. McCann; Colin F. Ross, both of Crickhowell, Wales

[73] Assignee: Lucas Industries Public Limited Company, Birmingham, England

[21] Appl. No.: 839,427

[22] Filed: Mar. 13, 1986

[30] Foreign Application Priority Data

Mar. 18, 1985 [GB] United Kingdom ............... 8506978

[51] Int. Cl.⁴ ............................................ B60T 11/34
[52] U.S. Cl. .................................... 303/92; 303/84 R
[58] Field of Search ................... 303/6 M, 7, 84 R, 92

[56] References Cited

U.S. PATENT DOCUMENTS 4,191,428 3/1980 Durling ...................... 303/84 R X Primary Examiner—Duane A. Reger
Attorney, Agent, or Firm—Harness, Dickey & Pierce

[57] ABSTRACT

A trailer air braking system has combined spring brake and service brake actuators, and the service brake chambers of the actuators are controlled by a combined emergency relay and modulator valve assembly of known construction. In order to ensure that the spring brake function does not become operative due to a moderate loss in the pressure of the trailer reservoir, such as would occur in the event of an anti-skid test in which the reservoir is isolated from the emergency line and the modulator valve is cycled, a spring brake one-way control valve is inserted into the spring brake circuit leading from the reservoir. The control valve acts in one condition as a one-way valve to prevent air returning from the spring brake actuator chamber to the reservoir, but on a large loss in reservoir pressure, a piston which carries the one-way valve seat and is subjected to reservoir pressure moves under spring biassing such that the one-way poppet valve member is unseated by a control pin to permit a reduction in spring brake pressure.

8 Claims, 6 Drawing Figures

VEHICLE ANTI-SKID AIR BRAKING SYSTEMS

This invention relates to a vehicle anti-skid braking system, particularly but not exclusively to an air braking system for the trailer of an articulated road vehicle.

The invention relates in particular to a vehicle anti-skid air braking system of the kind which comprises a supply of compressed air connected to an air reservoir, a service wheel brake actuator operatively connected to a wheel brake, a relay valve assembly controlling communication of the service wheel brake actuator on the one hand with the reservoir and on the other hand with atmosphere, a spring brake actuator operatively connected to a wheel brake and connected to the reservoir by way of a spring brake supply circuit which includes a spring brake operating valve capable of isolating the spring brake actuator from the reservoir and connecting it to atmosphere to apply the spring brake, a service air supply controlled by a brake pedal and connected to the relay valve assembly for controlling the operation thereof, and a modulator valve associated with the relay valve assembly and adapted in reponse to a skid signal from a skid sensor to operate the relay valve assembly so as to modulate the pressure applied to the service wheel brake actuator. Such a braking system will hereinafter be referred to as a 'braking system of the kind set forth'.

Usually the service wheel brake actuator will be combined with the spring brake actuator as a combined service and spring brake actuator.

The spring brake operating valve will usually be a manually-operable park valve which is operated to apply the spring brake actuator when the vehicle is parked.

When the braking system is applied to the trailer of an articulated vehicle, the relay valve assembly will usually be of the type known to the brake engineer as a 'relay emergency valve', which is a valve that differs from a basic relay valve in that the inlet valve seat is carried by a piston which moves in response to failure of the compressed air supply, to open the inlet valve and apply the service brake actuator, the charging line from the compressed air supply to the reservoir being routed through the relay valve for this purpose.

Such a system must conform to ECE Regulation 13 or EEC Directive 71/320. Included in these regulations is the need for the trailer to pass an "energy consumption" test. The test is intended to ensure that the trailer is provided with adequate air capacity. Prior to this test, the air reservoir is fully charged and no replenishing of the reservoir is permitted during the test. In the case of a tandem trailer, which is not fitted with spring brakes, the reservoir pressure could fall to 2.5 bar towards the end of the test. As the emergency relay valve operates typically below this figure, it is likely that the test will be completed without the brakes being locked on. If the brakes do lock on or drag during the test then this will normally result in failure.

However, when the emergency relay valve has an associated modulator valve to provide anti-skid modulation, there is a substantial loss of air pressure in the reservoir in supplying the relay valve during the energy consumption test, and since the spring brake actuator is also connected to the reservoir, air is also lost from the spring brake circuit at the same rate.

As the application of the spring brakes commences typically at 4.5 bar, the brakes could be dragging or locked on considerably sooner that the case of a trailer not fitted with spring brakes.

A possible solution to this would be to equip the trailer with a greater capacity air reservoir but this would incur greater expense and could provide installation difficulties.

Another solution would be to fit a non-return valve in the spring brake reservoir. However, we have appreciated that although this would overcome the energy consumption test problem, in the event of total or partial pressure loss from the reservoir, the spring brakes would be held off by the retained air pressure and would be ineffective.

According to the invention in a braking system of the kind set forth the spring brake supply circuit incorporates a control valve assembly which in a first condition acts substantially as a one-way valve to prevent, or substantially inhibit, return flow of air from the spring brake actuator to the reservoir, but in a second condition permits such return flow, or permits an increase in return flow, the control valve assembly being so arranged as to change from the first condition to the second condition in response to a drop in a control pressure below a predetermined value.

The control pressure may simply be the reservoir pressure, or a function of the difference between the reservoir pressure and the spring brake pressure.

The predetermined value of pressure can be chosen such that the control valve assembly remains in the first condition as the reservoir pressure falls during the previously mentioned energy consumption test, but that for severe loss of reservoir pressure the control valve assembly will assume the second condition, thereby venting the spring brake actuator air to the failed reservoir to apply the spring brake.

The control valve assembly may comprise a one-way valve in parallel with a bypass controlled by a pressure-conscious cut-off valve, the cut-off valve being closed in the first condition and open in the second condition. Preferably, however, it is arranged that a one-way valve is disabled in the second condition to permit return flow of fluid from the spring brake actuator to the reservoir through the one-way valve seat itself.

The control valve assembly preferably comprises a housing with a hollow piston slidably sealed in a bore in the housing, the piston housing a one-way valve member which is biassed against a valve seat on the piston by resilient means, the valve seat surrounding a port extending axially through one end of the piston, a valve control pin in the bore extending through the port and adapted to unseat the valve member when the piston is urged towards the control pin, the end of the bore provided with the control pin being connected to a first housing port adapted to be connected to the reservoir, and the interior of the piston being conected to a second housing port which is adapted to be connected to the spring brake actuator.

In one preferred arrangement the hollow piston is urged towards the control pin by a further resilient means which bears against the housing, and the opposite end of the bore from the control pin is vented to atmosphere, the interior of the piston being connected to the second housing port by way of a radial passage in the piston located axially between two axially spaced seals sealing the piston in the bore.

The further resilient means then preferably comprises a coiled compression spring of which the loading is adjustable by a screw threaded abutment member accessible from the exterior of the housing.

In another preferred arrangement the housing bore is of stepped outline with the control pin in the larger diameter end, and the smaller diameter end of the bore being connected to the second port, the piston being of differential outline and sealed in both bore portions, with the interior of the piston communicating with the smaller diameter bore portion, such that the larger end of the piston is exposed to the pressure at the first port, and the smaller end is exposed to the pressure at the second port.

With this arrangement, metering of air from the second port to the first port can be arranged to occur when the pressure difference between the first and second ports has exceeded the predetermined value, and the valve then acts as a pressure proportioning valve in controlling the reduction in the spring brake actuator pressure in response to falling reservoir pressure.

The control valve assembly may be incorporated in the spring brake supply circuit between the spring brake operating valve and the reservoir, or between the spring brake operating valve and the spring brake actuator.

Some embodiments of the invention will now be described, by way of example only, with reference to the accompanying drawings in which.

Figure 1:
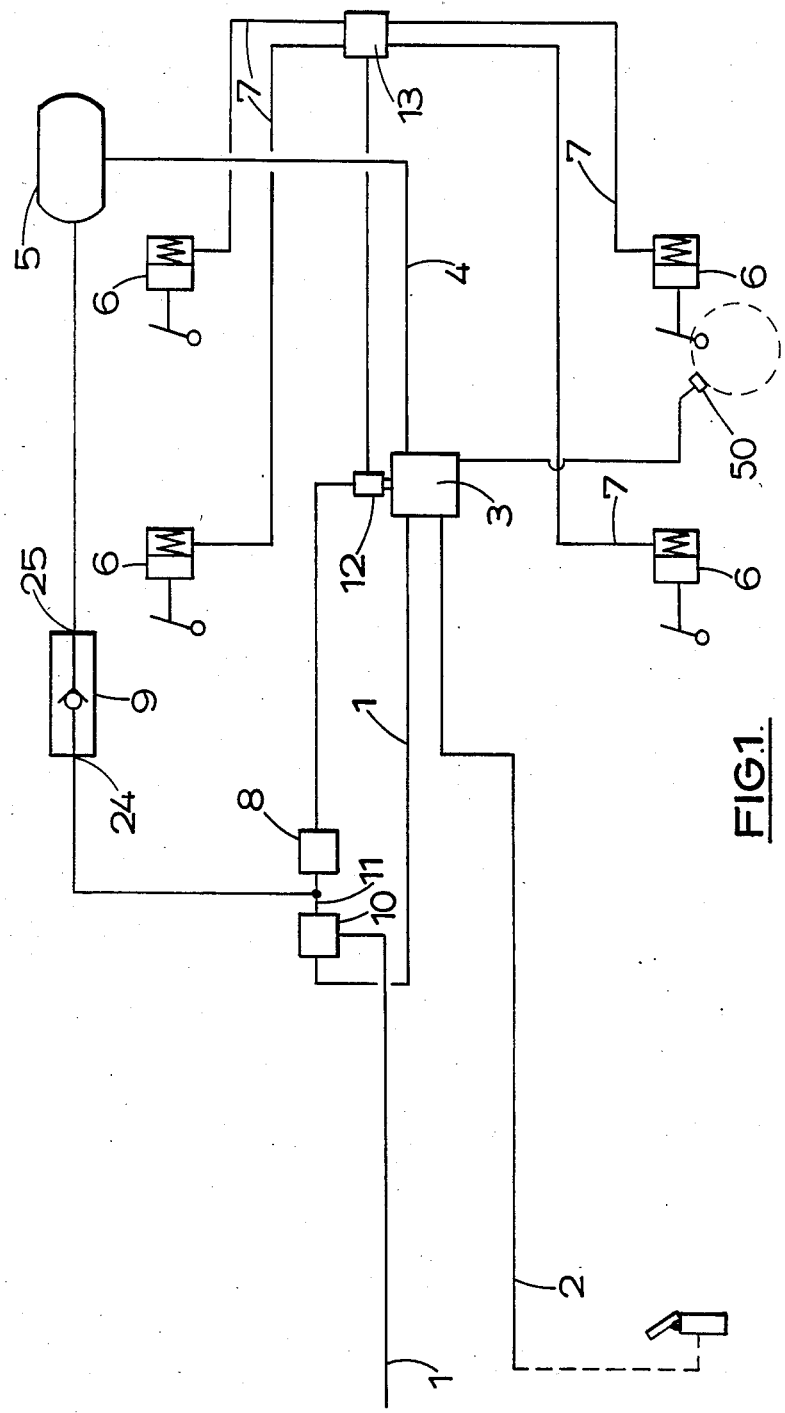
FIG. 1 is a circuit diagram of an air brake system for a road vehicle trailer and in accordance with the invention, but omitting the service brake delivery circuit and service brake actuator chambers.

With reference to FIG. 1, the so-called 'emergency line' 1, of the trailer of an articulated vehicle is connected by way of a first flexible hose extending between the tractor and trailer to a compressed air generator mounted on the tractor, and the so-called 'service line' 2 of the trailer is connected by way of a similar flexible hose to a supply line of the tractor which leads from the pedal-operated service valve in the tractor cab.

The valve assembly 3 to which both the emergency line 1 and service line 2 are connected is a combined modulator and relay emergency valve of known type. It is a relay valve of the kind in which a relay piston or diaphragm is exposed on one side to the fluid pressure from the service line, but is modulated by a solenoid-operated two-way three-port modulator valve under the control of skid signals from a skid sensor 50 associated in known manner with the trailer wheels, the relay piston operating a normally open exhaust valve and a normally closed inlet valve, the inlet valve seat being provided on an emergency piston which is subject to emergency line pressure.

Typical relay emergency valves are described at pages 224 to 232 of 'Air Brake Technology' (second edition, 1982) by M. N. Homewood, and a suitable valve 3 for the present circuit would be produced by adding a solenoid-operated modulator valve to the service brake valve port of such a relay valve.

The emergency line 1 communicates freely and continuously through valve 3 with a line 4 connected to a trailer reservoir 5. Each trailer wheel has an associated tandem service brake/spring brake actuator 6 to operate the brake shoes by means of respective wedge mechanisms. As is well known, each tandem actuator 6 includes tandem pistons or diaphragms, bounded respectively by service brake chambers and spring brake chambers. Pressure applied through the service delivery lines, not shown, to the service brake chambers of the actuators results in application of the brakes. The force of a spring acting on one piston of each actuator is normally counteracted by the pressure applied to the spring brake chambers through the spring brake lines 7 fed from reservoir 5 by way of a park valve 8 and a spring brake one-way control valve assembly 9.

The park valve 8 is a two-way three-port valve which permits the spring brakes to be applied by isolating the connection from valve assembly 9 and venting lines 7 to atmosphere.

A manoeuvering shuttle valve 10 in the emergency line 1 also has a connection 11 to the line connecting the valves 8 and 9, and permits the spring brakes to be held out of operation when it is required to manoeuvre a trailer without a tractor.

A differential protection shuttle valve 12 and a quick release valve 13 are provided for the usual reasons.

Figure 2:
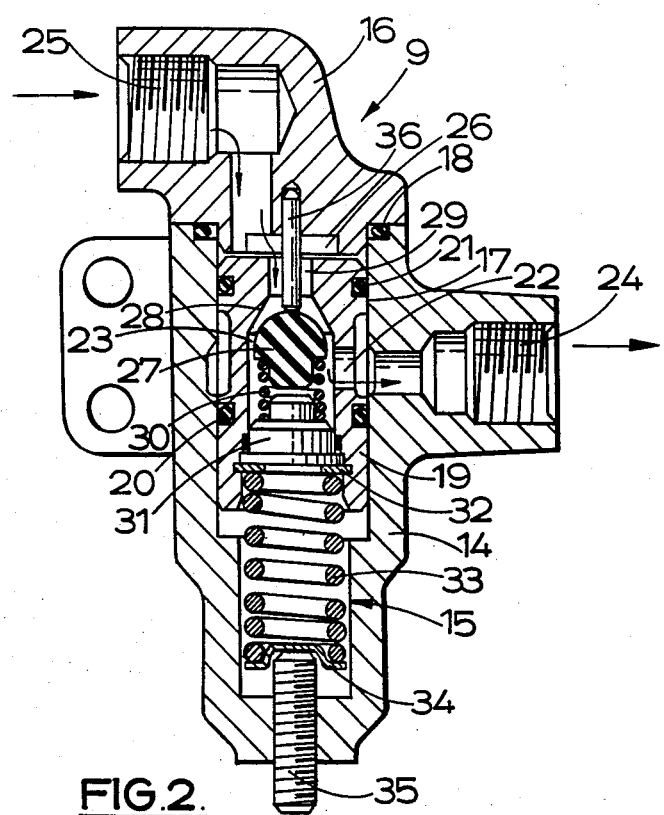
FIG. 2 is a vertical cross-section of a spring brake control valve assembly in accordance with the invention for use in the system of FIG. 1 or FIG. 6.

FIG. 2 shows a suitable spring brake one-way control valve assembly 9 for use in the system of FIG. 1. The housing of the valve comprises a body 14 provided with a stepped bore 15, and an end cap 16 which closes the larger diameter portion 17 of bore 15 and is sealed to the body by an O-ring 18. A hollow piston 19 is slidably sealed in bore portion 17 by a pair of axially spaced seals 20, 21 between which a radial port 22 in the piston provides permanent communication between the interior 23 of piston 19 and a housing port 24. Port 24 is connected in use to the spring brake actuators 7, as shown in FIG. 1, through park valve 8. The cap 16 has a port 25, which is connected in use to reservoir 5, and which communicates with a chamber 26 in bore portion 17 bounding the upper end, in the drawing, of piston 19.

A poppet valve member 27 is engageable with a valve seat 28 to define the one-way valve. The seat 28 is provided on frusto-conical internal walls of the piston 19 which lead from an axial passage 29 in the upper end of the piston. Poppet valve member 27 is urged towards seat 28 by a pre-loaded coiled compression spring 30 which reacts against a spigotted plug 31 sealingly retained in the lower end of the piston by a circlip 32.

The piston 19 itself is biassed upwardly in bore portion 17 by a pre-loaded coiled compression spring 33 which acts between the underside of circlip 32 and a dished abutment disc 34 engaged by an adjuster screw 35, the outer end of which is accessible from the exterior of the body 14 to enable the loading of spring 33 to be adjusted, in order to adjust the control pressure at which the poppet valve 27 is unseated by a control pin 36.

Control pin 36 is secured in a drilling in cap 16 and extends axially through passage 29, so as to unseat poppet valve member 27 from seat 28 when the piston has been urged upwards, as shown, from its normal position.

The operation of the control valve assembly 9 will now be described. When the vehicle is first started up air is supplied to reservoir 5 from emergency line 1 by way of valves 10 and 3 and line 4, and the spring brake actuator chambers are charged from the reservoir 5 by way of valve 9, valve 8 and valves 12 and 13 and lines 7.

The piston 19 is initially in its upper position, as shown, by virtue of the spring 33. The valve member 27 is held open by pin 36, and air flows freely from the reservoir to the spring brakes, by way of port 25, chamber 26, passage 29, open valve seat 28, interior chamber 23, radial port 22 and port 24.

The piston 19 is progressively forced downwards in bore portion 17 against the force of spring 33 by pressure building up in chamber 26. The pressure differential across the valve member 27, which is determined by the pre-load of spring 30, is sufficient to open the valve and allow air to continue to flow to the spring brakes.

The pressures on both sides of the one-way valve reach their maximum values with respect to atmosphere when reservoir 5 is fully charged. The spring brake pressure will lag behind the reservoir pressure slightly, because of the differential across the valve 9, produced by the force in the light spring 30 and the area of the valve member 27. The one-way valve will then close.

Figure 3:
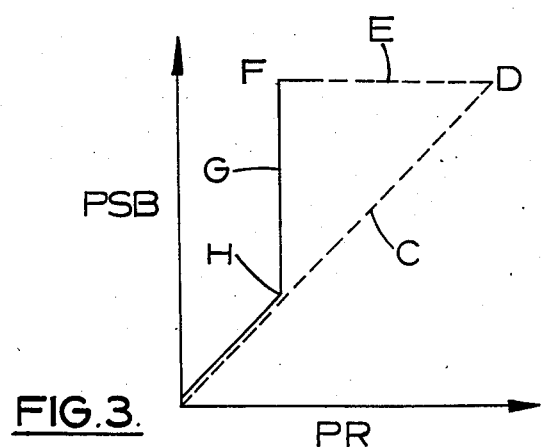
FIG. 3 is a graph illustrating the operation of the control valve assembly of FIG. 2.

The charging up of the reservoir and spring brake chambers is represented in FIG. 3 by the line C, these being fully charged at point D.

If an energy consumption test is now performed, as previously described, in which the emergency line 1 is closed, and the modulator valve is successively operated to cycle the relay valve 3, the pressure in reservoir 5 falls. The pressure in the chamber 26 also starts to decay, reducing the force holding the piston 19 against the spring 33, so the piston 19 starts to rise. As the piston 19 rises, the valve member 27 first contacts the pin 36, and then, following a further fall in reservoir pressure, the valve member 27 is moved off its seat 28 to open the one-way valve. Until the valve opens the spring brake pressure is held constant, as shown by line E in FIG. 3.

On opening of the one-way valve at point F the spring brake pressure falls rapidly, as depicted by line G, to equal the reservoir pressure at point H, and the spring brake operates.

The rate of pressure fall in the spring brakes may be reduced to provide a more gradual application by means of a restriction in the spring brake port 24 (not shown).

A severe loss of reservoir pressure, whether sudden or gradual, during trailer use under normal conditions results in the valve assembly 9 moving to the reservoir exhausted condition of FIG. 2 thus disabling the one-way valve and allowing operation of the spring brakes.

It will be appreciated that with the valve construction of FIG. 2 the point at which the one-way valve member 27 is unseated, point F, is determined by the reservoir pressure and the force of spring 33.

Figure 4:
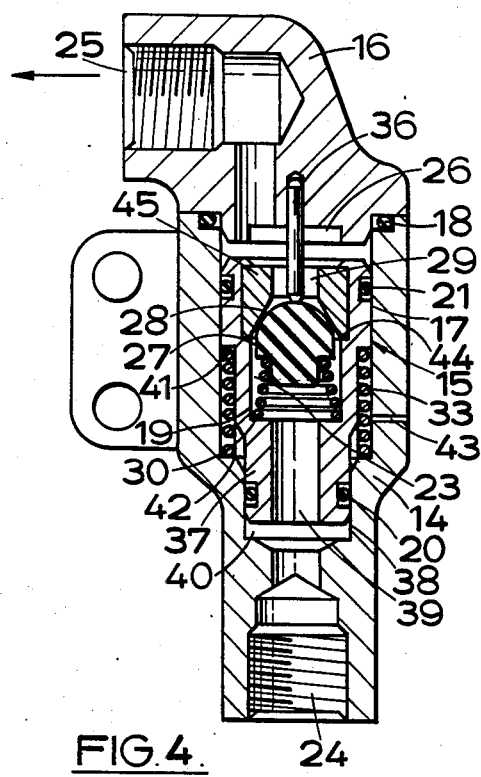
FIG. 4 is a vertical cross-section of a modified spring control valve assembly in accordance with the invention for use in the system of FIG. 1 or FIG. 6.

FIG. 4 shows a modified control valve 9, and parts corresponding to those of the valve of FIG. 2 have been given corresponding reference numbers. The valve is shown in the condition in which air is being metered back to the reservoir.

The valve of FIG. 4 differs from that of FIG. 2 in that the piston 19 is of differential outline, having at its lower end a reduced diameter tubular portion 37, which is sealed in the smaller diameter portion 38 of the housing bore 15, communication from the interior of piston 19 to spring brake port 24 being by way of an axial passage 39 in the piston portion 37 and a chamber 40 in bore portion 15 bounded by the lower end of piston 37. The lower end of the piston 19 is thereby subjected to spring brake pressure.

Spring 33 in this case can be a weaker spring than in the case of the FIG. 2 construction and is conveniently arranged in an annular chamber defined between a step 41 on piston 19 and a housing step 42 at the junction between bore portions 17 and 38, the spring abutting steps 41 and 42 at its opposite ends, and the annular chamber being vented to atmosphere by a vent 43. The spring 33 has a sufficient installed force to overcome the force of spring 30 and the seal friction of piston 19, to ensure that poppet valve 27 will be lifted from seat 28 on loss of the reservoir pressure.

The valve seat 28 in the FIG. 4 construction is provided on an annular valve seat insert 45 which is secured against an internal step 44 on the piston by peening over the upper end of the piston wall, the seat insert 45 holding captive the poppet valve member 27 with its spring 30.

Figure 5:
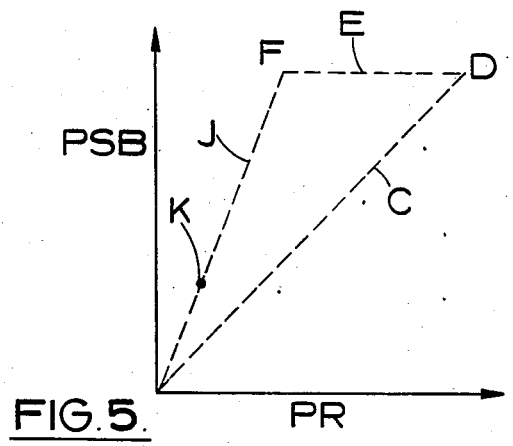
FIG. 5 is a graph illustrating the operation of the control valve assembly of FIG. 4.

This valve has the characteristics shown in the graph of FIG. 5. As the reservoir pressure decays the spring brake pressure initially remains held at E and then, as shown by line J, falls with the reservoir pressure (line C). The ratio of the spring brake pressure to the reservoir pressure (PSB/PR) is constant; in this case PSB/PR is 2.0. Thus when the spring brake cut in pressure is reached at K, the reservoir pressure will be only half the pressure at the corresponding point H in FIG. 3, so that early operation of the brakes is avoided.

The differential areas of the piston 19 exposed to reservoir and spring brake pressures respectively in chambers 26 and 40 are the means by which the ratio of PSB/PR is achieved over line J.

The operation of the valve of FIG. 4 will now be briefly described. On initial charging of the reservoir 5 from the emergency line 1, air pressure builds up in the reservoir port 25 and acts on the upper end of the piston 19, producing a force which overcomes the force in the spring 33. The piston 19 is moved to its lowermost position in which piston portion 37 abuts the lower end wall of the bore portion 38. The pressure differential across the valve member 27 is sufficient to open the valve and air flows freely from the reservoir to the spring brakes by way of passage 39 and port 24.

When the reservoir 5 is fully charged the pressures on both sides of the one-way valve reach their maximum value with respect to atmosphere. As with FIG. 2, there will be a slight pressure lag across the one-way valve. The one-way valve will close.

During the energy consumption test, previously mentioned, the valve assembly 9 operates in the same way as the valve assembly of FIG. 2 until the one-way valve opens. Thus, when this valve opens, at point F, the spring brake pressure (line J) starts to fall as the reservoir pressure (line C) decays. However, the piston 19 moves, in response to the pressures in the chambers 26 and 40, so that the valve member 27 meters the spring brake pressure to provide the constant ratio PSB/PR as the pressures fall. This is the condition shown in FIG. 4. Thus, the valve assembly 9 acts as a pressure proportioning valve of the metering kind in determining the line J.

When the reservoir is exhausted, the piston 19 returns to its uppermost position in which the valve member 27 is held open by the pin 36.

As with the embodiment of FIG. 2, loss of reservoir pressure in normal use results in the valve assembly 9 moving to the reservoir-exhausted condition, thus disabling the one-way valve and allowing operation of the spring brakes.

Figure 6:
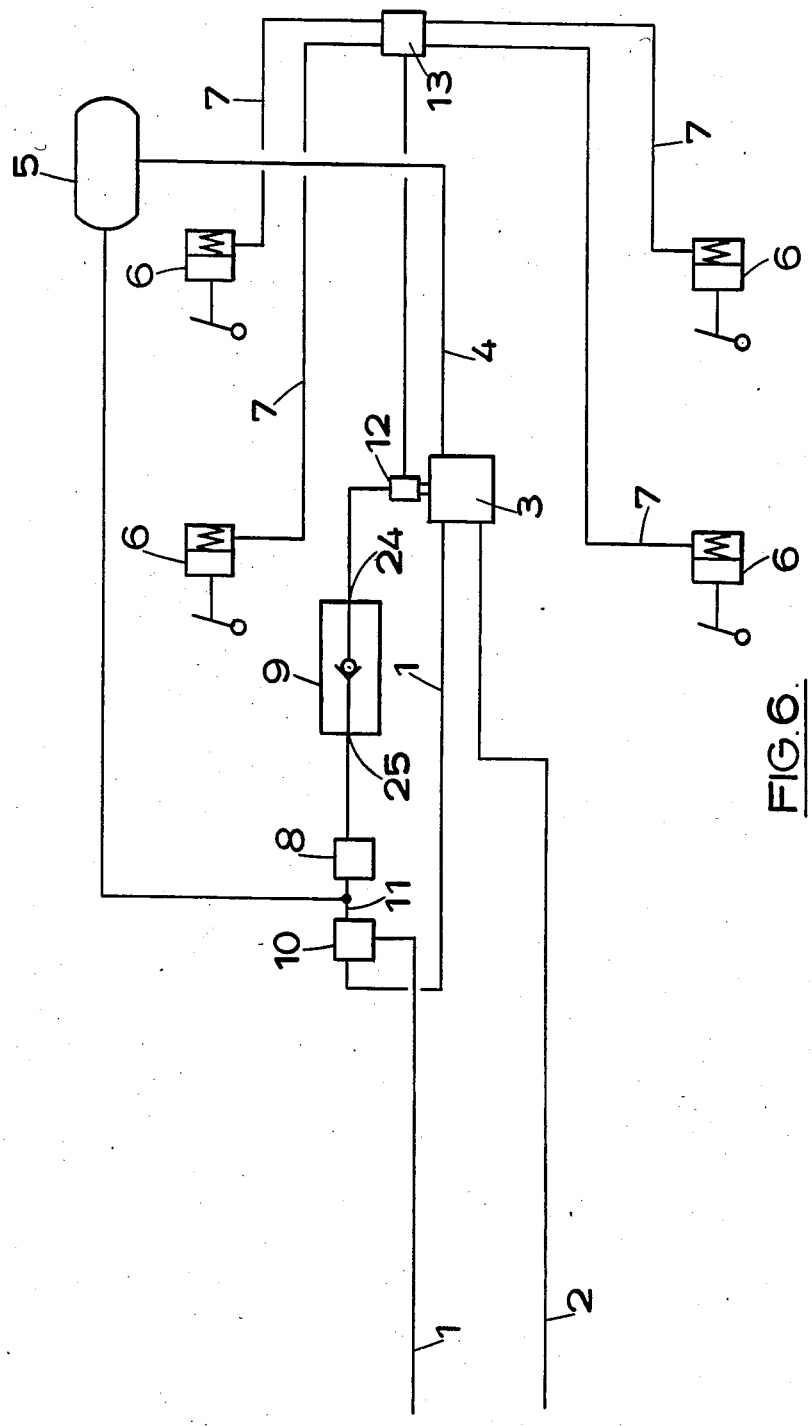
FIG. 6 is a circuit diagram similar to FIG. 1 but showing an alternative position for the spring brake valve control assembly.

FIG. 6 shows a different position for the spring brake one-way control valve assembly 9. With the FIG. 1 arrangement, if the piston 19 of valve assembly 9 of either FIGS. 2 or 4 were to seize in the lowermost position and air loss from the reservoirs occurred, the spring brakes would not be applied as the valve assembly 9 would simply function as a one-way valve.

No advance warning of a seized piston 19 would be detected in normal trailer operation, which is a disadvantage, although even if the piston seized the parking action of the spring brakes would be unaffected.

The alternative position of the valve assembly 9 as shown in FIG. 6 helps to overcome this problem.

In FIG. 6 the valve assembly 9 functions in the same way as it does in FIG. 1 when the reservoir pressure is lost, but in addition evey time the park valve 8 is operated the piston 19 moves to the reservoir-exhausted position. This has two advantages. First, the regular cycling of the piston 19 reduces the likelihood of seizure. Second, if the piston 19 seized in its lowermost position it would not be possible to operate the spring brakes for parking and an indication of valve failure would be given in a non-emergency situation.

We claim:

1. A vehicle anti-skid air braking system comprising a supply of compressed air, an air reservoir connected to said supply, a wheel brake, a service wheel brake actuator operatively connected to said wheel brake, a relay valve means controlling communication between said service wheel brake actuator and said reservoir, and between said service wheel brake and atmosphere, a brake pedal, a service air supply controlled by said brake pedal and connected to said relay valve means for controlling the operation thereof, a skid sensor for providing skid signals, a modulator valve means accodiated with said relay valve means, said modulator valve means operating said relay valve means in response to a skid signal from said skid sensor to modulate the pressure applied to said service wheel brake actuator; a spring brake actuator operatively connected to said wheel brake, and a spring brake supply circuit for connecting said spring brake actuator to said reservoir, said spring brake supply circuit incorporating a spring brake operating valve means for isolating said spring brake actuator from said reservoir and a control valve means, said control valve means operating in response to a control pressure and having first and second conditions, and changing from said first to said second condition in response to a drop in said control pressure below a predetermined value, whereby in said first condition said control valve means comprises a one-way valve substantially preventing return flow of air from said spring brake actuator to said reservoir, and in said second condition said one-way valve is disabled to permit said return flow of fluid through said one-way valve itself, said control valve means comprising a housing with a bore having first and second ends, a hollow piston slidably sealed in said bore, said piston having first and second ends, and an interior, a valve seat on said piston, and a one-way valve member housed in said piston, with resilient means biassing said valve member against said seat, said valve seat surrounding a port extending axially through said first end of said piston, a valve control pin in said first end of said bore extending through said port for unseating said valve member when said piston is urged towards said control pin, said first end of said bore being connected to a first housing port for connection to said reservoir and said interior of said piston being connected to a second housing port for connection to said spring brake actuator.

2. A vehicle anti-skid air braking system as claimed in claim 1, wherein said control pressure comprises pressure in said reservoir.

3. A vehicle anit-skid air braking system as claimed in claim 1, wherein said control pressure is a function of the difference between the pressure in said reservoir and the pressure in said spring brake actuator.

4. A vehicle anti-skid air braking system as claimed in claim 1, wherein said hollow piston is urged towards said control pin by a further resilient means bearing against said housing, and said second end of said bore is vented to atmosphere, a radial passage connects said interior of said piston to said second housing port, and two axially spaced seals are provided for sealing said piston in said bore, said radial passage being located axially between said seals.

5. A vehicle anti-skid air braking system as claimed in claim 4, wherein said further resilient means comprises a coiled compression spring, and a screw-threaded abutment member accessible from the exterior of said housing is provided for adjusting the loading of said spring.

6. A vehicle anti-skid air braking system as claimed in claim 1, wherein said housing bore is of stepped outline having larger and smaller bore portions, with said control pin located in said larger diameter bore portion, and said smaller diameter bore portion connected to said second housing port, said piston being of differential outline such that said first end of said piston is larger than said second end, said piston being sealed in both said bore portions, with said interior of said piston communicating with said smaller diameter bore portion, such that said first larger end of said piston is exposed to pressure at said first housing port and said second smaller end is exposed to the pressure at said second housing port.

7. A vehicle anti-skid air braking system as claimed in claim 1, wherein said control valve means is incorporated in said spring brake supply circuit between said spring brake operating valve means and said reservoir.

8. A vehicle anti-skid air braking system as claimed in claim 1, wherein said control valve means is incorporated in said spring brake supply circuit between said spring brake operating valve means and said spring brake actuator.

* * * * *